United States Patent
Schleicher et al.

(10) Patent No.: US 6,345,938 B1
(45) Date of Patent: Feb. 12, 2002

(54) PROCESS FOR DRILLING AT LEAST TWO HOLES IN A TWO-STEP CYCLE

(75) Inventors: Andrej Schleicher, Belm; Karl-Peter Brandt, Bramsche, both of (DE)

(73) Assignee: ZF Lemforder Metallwaren AG (DE)

( * ) Notice: Subject to any disclaimer, the term of this patent is extended or adjusted under 35 U.S.C. 154(b) by 0 days.

(21) Appl. No.: 09/508,723
(22) PCT Filed: Jul. 8, 1999
(86) PCT No.: PCT/DE99/02102
   § 371 Date: May 18, 2000
   § 102(e) Date: May 18, 2000
(87) PCT Pub. No.: WO00/03824
   PCT Pub. Date: Jan. 27, 2000

(30) Foreign Application Priority Data

Jul. 15, 1998 (DE) .......................................... 198 31 625

(51) Int. Cl.⁷ ............................................. B23B 35/00
(52) U.S. Cl. ........................... 408/1 R; 408/44; 408/50; 408/70
(58) Field of Search .................... 408/1 R, 43, 44, 408/45, 50, 53, 69, 70, 91

(56) References Cited

U.S. PATENT DOCUMENTS

| | | | | |
|---|---|---|---|---|
| 1,755,401 A | * | 4/1930 | Koehl et al. | 408/53 |
| 2,864,416 A | * | 12/1958 | Sherwood | 408/50 |
| 3,240,084 A | * | 3/1966 | Palmer | 408/50 |
| 3,280,659 A | * | 10/1966 | Allen | 408/70 |
| 4,185,943 A | | 1/1980 | Hautau | |
| 5,111,573 A | | 5/1992 | Ito et al. | |

FOREIGN PATENT DOCUMENTS

| | | | | |
|---|---|---|---|---|
| DE | 145 367 | | 2/1902 | |
| DE | 1027959 A | * | 4/1958 | 408/45 |
| DE | 40 31 284 C2 | | 10/1993 | |
| DE | 41 12 706 C2 | | 2/1994 | |
| JP | 60034204 | | 2/1985 | |

* cited by examiner

*Primary Examiner*—Daniel W. Howell
(74) *Attorney, Agent, or Firm*—McGlew and Tuttle, P.C.

(57) ABSTRACT

A process is provided for drilling at least two holes with a device. The device has at least one double-spindle machining unit (2), which can be moved along a first travel axis (Y), and a linear carriage unit (3) with a duplicate work holding fixture (4) for two workpieces (5.1, 5.2). The linear carriage unit can be moved along a second travel axis (X) independently from the machining unit. The following steps are performed one after another:

Drilling of a first hole in a first workpiece (5.1) (first cycle), subsequent drilling of a second hole in the first workpiece (5.1) and simultaneous drilling of a first hole in a second workpiece (5.2) (second cycle), removal of the first workpiece (5.1), loading of a third workpiece (5.3), and drilling of a second hole in the second workpiece (5.2) and simultaneous drilling of a first hole in the third workpiece (5.3).

12 Claims, 1 Drawing Sheet ced workpiece and a first hole is drilled in the workpiece loaded last. The workpieces are machined one after another, and a completely machined workpiece is removed after each work cycle beginning from the second cycle, and the duplicate work holding fixture is loaded with a new workpiece (blank).

PROCESS FOR DRILLING AT LEAST TWO HOLES IN A TWO-STEP CYCLE

FIELD OF THE INVENTION

The present invention pertains to a process for drilling at least two holes in a workpiece in a two-step cycle by means of at least one double-spindle machining unit.

BACKGROUND OF THE INVENTION

Two machining variants of simultaneously drilling two holes in a workpiece have been known in practice. They are:
  Variant 1: Drilling with the use of double-spindle machining centers, or
  Variant 2: Drilling on two-way drills.

In Variant 1, two holes are drilled simultaneously in a workpiece in each cycle. The distance between the centers of the two holes is equal to the distance between the axes of the tool spindles. However, the distance between the axes of the tool spindles is not variable, especially in machine tools of a simple design. However, this means that different workpieces with different distances between the centers of the holes would have to be machined on different machine tools, which would lead to high investment cost for a comparatively slight change. An alternative could be at best the use of new bearings for the tool spindles, and these bearings would be weaker in the case of a smaller distance between the holes in the workpiece. However, the effort necessary for this is rather high and also undesirable, because a weakening of the tool spindle bearing as a whole is disadvantageous. The flexibility of the machining possibilities is thus very greatly limited in the case of the machining of workpieces with double-spindle machining centers.

In Variant 2, two workpieces are machined simultaneously by two machining units acting usually in opposite directions due to the movement of a duplicate work holding fixture in two-step cycle. Even though the flexibility of this technological process is substantially higher than that of the above-described Variant 1, two finished workpieces are present here after each cycle of the machine, and these workpieces must be removed and reloaded simultaneously. This requires a high level of technical effort for the upstream and downstream units and/or machining stations.

SUMMARY AND OBJECTS OF THE INVENTION

The basic technical problem of the present invention is to change the technological process of drilling at least two holes in a workpiece such that while the flexibility and the output of the machine are high, simpler peripheral means can be used.

A device for carrying out the process according to the present invention has, to begin with, at least one double-spindle machining unit, which is simultaneously movable along a first travel axis, and a linear carriage unit with a duplicate work holding fixture for two workpieces, which can be moved along a second travel axis independently from the machining unit. The technical problem is accomplished according to the present invention by first drilling a first hole in a first workpiece in a first cycle, after which a second hole is drilled in the first workpiece and a first hole is simultaneously drilled in a second workpiece in a second cycle.

Once this second cycle has been concluded as well, the first workpiece is removed from the duplicate work holding fixture and the duplicate work holding fixture is loaded with another workpiece. A second hole is now drilled in the second workpiece and a first hole is drilled in the workpiece loaded last. The workpieces are machined one after another, and a completely machined workpiece is removed after each work cycle beginning from the second cycle, and the duplicate work holding fixture is loaded with a new workpiece (blank).

Such a process offers the advantages of a higher flexibility along with a simultaneous simplification of the design of the peripheral means as they are usually used in double-spindle machining centers, corresponding to the above-described prior-art Variant 1.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
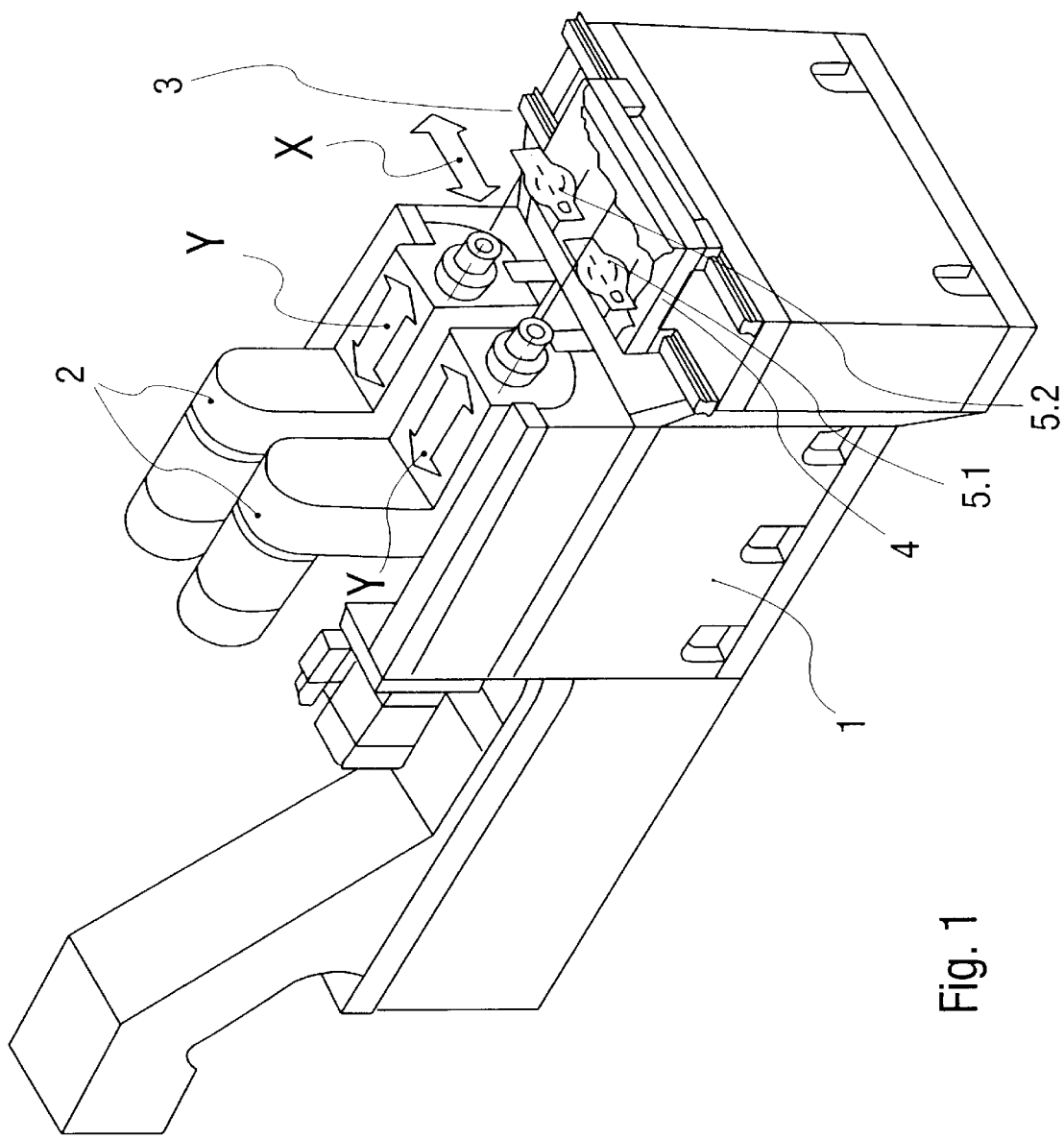
FIG. 1 is a perspective view showing a horizontal drill with a linear carriage unit.

Referring to the drawings in particular, the process according to the present invention will be described below on the basis of the special machining of a ball piece on a horizontal drill. Such a ball piece has a central ball body with two pins arranged diametrically opposed, in which a hole each is to be drilled. The horizontal drill shown in FIG. 1 comprises a substructure 1 with two double-spindle machining units 2, which are movable simultaneously along a travel axis Y, and a linear carriage unit 3 with a duplicate work holding fixture 4 for two workpieces, which are movable along a travel axis X. In the embodiment shown, the travel axes X and Y extend approximately at right angles to one another.

At the beginning of the machining, the duplicate work holding fixture 4 is first loaded with a first workpiece such as workpiece 5.1. After the travel of the machining units 2 along the travel axis Y toward the workpiece, the first hole (No. 1) is now drilled in the first workpiece 5.1.

Once this hole (No. 1) has been finished, the first workpiece 5.1 is moved along the travel axis X by means of the linear carriage unit 3 by a certain amount, which is equal to the distance between the centers of the holes of a workpiece.

The duplicate work holding fixture 4 is subsequently loaded with the second workpiece 5.2. The second hole is drilled in the first workpiece and the first hole is drilled in the second workpiece simultaneously due to the subsequent feed motion of the machining unit 2.

The first workpiece 5.1 can now be removed and a new workpiece blank 5.3 can be inserted into the duplicate work holding fixture. After moving the workpieces together with the duplicate work holding fixture 4 into the starting position, the first hole is drilled in the third workpiece together with the second hole in the second workpiece.

Once both holes have been finished in the second workpiece (5.2), this workpiece is also removed from the duplicate work holding fixture 4 and another workpiece is loaded.

The duplicate work holding fixture 4 is correspondingly moved along the travel axis X after each operation by an amount that is equal to the distance between the centers of the holes in the workpieces.

The process according to the present invention creates a continuous loading and unloading process involving one workpiece each time, even though two workpieces are machined simultaneously. With high flexibility and high output of the machine, simpler peripheral means can thus be used for loading and unloading the workpieces.

While a specific embodiment of the invention has been shown and described in detail to illustrate the application of the principles of the invention, it will be understood that the invention may be embodied otherwise without departing from such principles.

What is claimed is:

1. A process for drilling at least two holes in each of several workpieces, the process comprising the steps of providing:

a device, which has at least one double-spindle machining unit, which can be moved along a first travel axis, and a linear carriage unit with a duplicate work holding fixture for two of the workpieces, wherein the linear carriage unit can be moved along a second travel axis independently from the machining unit;

drilling a first hole in a first workpiece;

subsequent to said step of drilling a first hole, drilling a second hole in the first workpiece and simultaneously drilling a first hole in a second workpiece;

removing the first workpiece from the duplicate work holding fixture;

loading a third workpiece onto the duplicate work holding fixture; and drilling a second hole in the second workpiece and simultaneous drilling a first hole in the third workpiece.

2. A process in accordance with claim 1, wherein each step of drilling forms a cycle and a finished workpiece is removed after each cycle following a second cycle and the duplicate work holding fixture is loaded with another workpiece.

3. A process in accordance with claim 1, wherein a distance between the holes in the workpiece is determined by the amount of the travel of the double-spindle machining unit.

4. A process in accordance with claim 2, wherein a distance between the holes in the workpiece is determined by the amount of the travel of the double-spindle machining unit.

5. A process for drilling at least two holes in each of several workpieces, the process comprising the steps of:

providing a device, which has at least one double-spindle machining unit, which can be moved along a first travel axis, and a linear carriage unit with a duplicate work holding fixture for two of the workpieces, wherein the linear carriage unit can be moved along a second travel axis independently from the machining unit;

loading a first workpiece onto the duplicate work holding fixture and loading a second workpiece onto the duplicate work holding fixture;

drilling a first hole in the first workpiece in a first cycle;

in a second cycle drilling a second hole in the first workpiece and simultaneously drilling a first hole in a second workpiece;

removing the first workpiece from the duplicate work holding fixture;

loading a third workpiece onto the duplicate work holding fixture; and in a third cycle drilling a second hole in the second workpiece and simultaneous drilling a first hole in the third workpiece.

6. A process in accordance with claim 5, wherein a finished workpiece is removed after each cycle following the second cycle and the duplicate work holding fixture is loaded with another workpiece.

7. A process in accordance with claim 5, wherein a distance between the holes in the workpiece is determined by the amount of the travel of the double-spindle machining unit.

8. A process in accordance with claim 6, wherein a distance between the holes in the workpiece is determined by the amount of the travel of the double-spindle machining unit.

9. A process for drilling at least two holes in each of several workpieces with a device, which has at least one double-spindle machining unit, which can be moved along a first travel axis, and a linear carriage unit with a duplicate work holding fixture for two of the workpieces, wherein the linear carriage unit can be moved along a second travel axis independently from the machining unit, the process comprising the steps of:

drilling a first hole in a first workpiece during a first drilling phase;

subsequent to said first drilling phase, drilling a second hole in the first workpiece and simultaneously drilling a first hole in a second workpiece;

removing the first workpiece from the duplicate work holding fixture;

loading a third workpiece onto the duplicate work holding fixture; and drilling a second hole in the second workpiece and simultaneous drilling a first hole in the third workpiece during a third drilling phase.

10. A process in accordance with claim 9, a finished workpiece is removed after each drilling phase following the second drilling phase and the duplicate work holding fixture is loaded with another workpiece.

11. A process in accordance with claim 9, wherein a distance between the holes in the workpiece is determined by the amount of the travel of the double-spindle machining unit.

12. A process in accordance with claim 10, wherein a distance between the holes in the workpiece is determined by the amount of the travel of the double-spindle machining unit.

* * * * *